UNITED STATES PATENT OFFICE.

WILLIAM B. CHISOLM, OF CHARLESTON, SOUTH CAROLINA.

IMPREGNATING WOOD.

965,154.

No Drawing.

Specification of Letters Patent. Patented July 26, 1910.

Application filed August 16, 1909. Serial No. 513,039.

*To all whom it may concern:*

Be it known that I, WILLIAM B. CHISOLM, a citizen of the United States, residing at Charleston, in the county of Charleston, in the State of South Carolina, have invented certain new and useful Improvements in Impregnating Wood; and I do hereby declare the following to be a full, clear, and exact description of the invention, such as will enable others skilled in the art to which it appertains to make and use the same.

In a copending application for Letters Patent of the United States, Serial Number 478,237, I have described the impregnation of wood for the purpose of preserving it from decay, by means of a solution containing sulfur chemically combined and sulfur in a practically free state.

In the practice of the invention described in my said application, I have chosen as a typical embodiment thereof the impregnation of wood by a solution made up by boiling sulfur and lime in water in the proportion of four parts by weight of sulfur to one part by weight of lime. On account of the relative proportions of the sulfur and lime in this particular embodiment of the invention described in my said application, the final solution used for impregnating the wood, although alkaline in reaction, contains no substantial excess of free alkali.

The purpose of my present invention is to employ as the impregnating solution, one which is not only alkaline in its character, but which carries a considerable excess of free alkali. The function of having an excess of alkali in the impregnating solution is twofold; first, it increases the capillary activity of the solution, enabling it to more readily penetrate the wood, and secondly, the caustic alkali exerts a hydrolyzing action upon the cellulose. Furthermore, in addition to these effects, the caustic alkali forms a semi-solution of certain portions of the lignin matter of the wood, converting them into a material of a slightly gummy or viscous character, which, when dried, hardens and acts as a sizing matter throughout the wood. This hardening of the wood is accompanied with the formation therein of new chemical compounds of very complex character. The effect is to cause the wood to shrink, thereby making it denser and better adapted to hold within the wood the free sulfur deposited from the solution in time and also the sulfur compounds, of whatever character that remain therein. As a consequence, there is less tendency for any of the soluble sulfur compounds with which the wood is impregnated to leach out, because of the fact that they are surrounded or enveloped in this hydrolyzing and gelatinized mass.

In putting the invention into practice, I may boil together in water a mixture of an alkali such as slaked lime (calcium hydroxid) and sulfur in the proportions by weight of one part of sulfur to one part of calcium hydroxid. These equal proportions will give a resulting solution that contains a slight excess of caustic alkali sufficient to develop a certain degree of hardening effect, but I prefer to use a larger portion of the caustic alkali, as, for instance, by forming the mixture of three parts by weight of calcium hydroxid to two parts by weight of sulfur. This additional amount of caustic alkali in the solution will be sufficient when used at or near the boiling temperature to fully develop the hydrolyzing, gelatinizing and hardening functions desired.

A solution made in the manner described carries not only free alkali but more or less dissolved sulfur which is in a free, or potentially free state, and also sulfur in a state of combination which is readily broken up so that the liquid will deposit sulfur on cooling and in time. This dissolved sulfur which is in a state of solution at the time of impregnating the wood and enters the wood in that state, and subsequently separates in a free or elemental form may be regarded as free or potentially free sulfur.

The impregnation of the wood may be effected in any of the usual or preferred methods, as, for example, by the usual vacuum and pressure processes, and preferably at the boiling point of the solution. In wood so impregnated there will be deposited a large proportion of sulfur, both in the free and in the combined form, the sulfur being partly in the free or elemental form and partly in the form of sulfur compounds which become more and more insoluble under the effect of subsequent chemical change.

Having thus described my invention, what I claim is:

1. The method of treating wood, which consists in impregnating its pores with an aqueous solution carrying combined sulfur and also carrying free sulfur, together with an excess of caustic alkali sufficient to partially hydrolyze the cellulose and partially gelatinize the lignin of the wood; substantially as described.

2. The method of treating wood which comprises impregnating its pores with an aqueous solution carrying combined sulfur and also free sulfur together with an excess of lime, such lime being present in amount sufficient to partly hydrolyze the cellulose and partly gelatinize the lignin of the wood.

3. The method of treating wood which comprises impregnating its pores with a boiling aqueous solution carrying combined sulfur and also free sulfur together with an excess of lime, such lime being present in amount sufficient to partly hydrolyze the cellulose and partly gelatinize the lignin of the wood.

4. As a new article of manufacture, wood whose cellulose is partially hydrolyzed and whose lignin is partially gelatinized, said wood being likewise impregnated with free sulfur and with combined sulfur; substantially as described.

In testimony whereof I affix my signature, in presence of two witnesses.

WILLIAM B. CHISOLM.

Witnesses:
JOHN C. PENNIE,
LAURA B. PENFIELD.

---

Correction in Letters Patent No. 965,154.

It is hereby certified that in Letters Patent No. 965,154, granted July 26, 1910, upon the application of William B. Chisolm, of Charleston, South Carolina, for an improvement in "Impregnating Wood," an error appears in the printed specification requiring correction as follows: Page 1, line 62, the word "hydrolizing" should read *hydrolized;* and that the said Letters Patent should be read with this correction therein that the same may conform to the record of the case in the Patent Office.

Signed and sealed this 30th day of August, A. D., 1910.

[SEAL.]

F. A. TENNANT,

*Acting Commissioner of Patents.* an excess of caustic alkali sufficient to partially hydrolyze the cellulose and partially gelatinize the lignin of the wood; substantially as described.

2. The method of treating wood which comprises impregnating its pores with an aqueous solution carrying combined sulfur and also free sulfur together with an excess of lime, such lime being present in amount sufficient to partly hydrolyze the cellulose and partly gelatinize the lignin of the wood.

3. The method of treating wood which comprises impregnating its pores with a boiling aqueous solution carrying combined sulfur and also free sulfur together with an excess of lime, such lime being present in amount sufficient to partly hydrolyze the cellulose and partly gelatinize the lignin of the wood.

4. As a new article of manufacture, wood whose cellulose is partially hydrolyzed and whose lignin is partially gelatinized, said wood being likewise impregnated with free sulfur and with combined sulfur; substantially as described.

In testimony whereof I affix my signature, in presence of two witnesses.

WILLIAM B. CHISOLM.

Witnesses:
JOHN C. PENNIE,
LAURA B. PENFIELD.

---

Correction in Letters Patent No. 965,154.

It is hereby certified that in Letters Patent No. 965,154, granted July 26, 1910, upon the application of William B. Chisolm, of Charleston, South Carolina, for an improvement in "Impregnating Wood," an error appears in the printed specification requiring correction as follows: Page 1, line 62, the word "hydrolizing" should read *hydrolized;* and that the said Letters Patent should be read with this correction therein that the same may conform to the record of the case in the Patent Office.

Signed and sealed this 30th day of August, A. D., 1910.

[SEAL.]

F. A. TENNANT,
*Acting Commissioner of Patents.*

It is hereby certified that in Letters Patent No. 965,154, granted July 26, 1910, upon the application of William B. Chisolm, of Charleston, South Carolina, for an improvement in "Impregnating Wood," an error appears in the printed specification requiring correction as follows: Page 1, line 62, the word "hydrolizing" should read *hydrolized;* and that the said Letters Patent should be read with this correction therein that the same may conform to the record of the case in the Patent Office.

Signed and sealed this 30th day of August, A. D., 1910.

[SEAL.]

F. A. TENNANT,

*Acting Commissioner of Patents.*